US009792664B2

(12) United States Patent  
Gupta et al.

(10) Patent No.: US 9,792,664 B2  
(45) Date of Patent: Oct. 17, 2017

(54) SYSTEM AND METHOD FOR MAPPING OBJECT COORDINATES FROM A VIDEO TO REAL WORLD COORDINATES USING PERSPECTIVE TRANSFORMATION

(71) Applicant: Wipro Limited, Bangalore (IN)

(72) Inventors: Akash Gupta, Jaipur (IN); Rinku Vatnani, Indore (IN); Krupal Chandresh Modi, Ahmedabad (IN); Akbar Abdulmalik Ladak, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 305 days.

(21) Appl. No.: 14/662,173

(22) Filed: Mar. 18, 2015

(65) Prior Publication Data

US 2016/0225121 A1 Aug. 4, 2016

(30) Foreign Application Priority Data

Jan. 29, 2015 (IN) .............................. 420/CHE/2015

(51) Int. Cl.
*G06K 9/00* (2006.01)
*G06T 3/00* (2006.01)
*G06T 7/246* (2017.01)

(52) U.S. Cl.
CPC ............... *G06T 3/00* (2013.01); *G06T 7/246* (2017.01); *G06K 9/00771* (2013.01);
(Continued)

(58) Field of Classification Search
CPC .... G06T 7/70; G06T 7/80; G06T 7/97; G06T 7/246; G06T 7/292; G06T 7/337; G06K 2017/0045; G06K 9/00624
See application file for complete search history.

(56) References Cited

U.S. PATENT DOCUMENTS 8,711,221 B2   4/2014 Eggert et al.
8,995,793 B1*  3/2015 Laflen ...................... G06T 7/40
                                                    382/299
(Continued)

FOREIGN PATENT DOCUMENTS

WO    WO 97/05741      2/1997
WO    WO 2013/021150   2/2013

OTHER PUBLICATIONS

K. Sato et al., "CAD-based object tracking with distributed monocular camera for security monitoring", *Proceedings of the 1994 Second CAD-Based Vision Workshop*: Feb. 8-11, 1994 Champion, Pennsylvania, Jan. 1, 1994, pp. 291-297.

(Continued)

*Primary Examiner* — Wesley Tucker
(74) *Attorney, Agent, or Firm* — Finnegan, Henderson, Farabow, Garrett & Dunner LLP

(57) ABSTRACT

This disclosure relates generally to video analysis, and more particularly to systems and methods for mapping object co-ordinates from a video frame view to real world co-ordinates using perspective transformation. In one embodiment, a processor-implemented video frame coordinate transformation method is disclosed. The method may include obtaining an image from an image capture device and identifying, via one or more hardware processors, an object depicted in the image. Further, the method may include determining image-frame object coordinates for the object, and selecting one of a plurality of coordinate transformation matrices associated with the image capture device, based on the image-frame object coordinates for the object. Also, the method may include calculating, via the one or more hardware processors, real-world object coordinates for the object using the image-frame coordinates and the selected coordinate transformation matrix, and determining (Continued)

a trajectory of the object using the calculated real-world object coordinates.

21 Claims, 6 Drawing Sheets

(52) U.S. Cl.
CPC ............ *G06T 2207/30232* (2013.01); *G06T 2207/30236* (2013.01); *G06T 2207/30241* (2013.01)

(56) References Cited

U.S. PATENT DOCUMENTS

| | | | |
|---|---|---|---|
| 2002/0181741 A1* | 12/2002 | Masukura | G06T 7/20 382/103 |
| 2003/0053658 A1* | 3/2003 | Pavlidis | G06K 9/00335 382/103 |
| 2011/0128388 A1* | 6/2011 | Pai | G01B 11/03 348/187 |
| 2012/0154579 A1 | 6/2012 | Hampapur et al. | |
| 2013/0300831 A1 | 11/2013 | Mavromatis et al. | |
| 2014/0214885 A1 | 7/2014 | Park et al. | |

OTHER PUBLICATIONS

Dirk Farin et al., "Floor-Plan reconstruction from panoramic images", *Proceedings of the 15th International Conference on Multimedia 2007*, Jan. 1, 2007, 4 pages.

T.J. Ellis et al., "Learning a multi-camera topology", *Joint IEEE International Workshop on Visual Surveillance and Performing Evaluation of Tracking and Surveillance*, Jan. 1, 2003, 8 pages.

European Search Report dated Jun. 16, 2016 in European Patent Office in counterpart European Patent No. Application 15191919.8. 10 pages.

Nam et al.; "Learning Spatio-Temporal Topology of a Multi-Camera Network by Tracking Multiple People"; World Academy of Science, Engineering and Technology 6 2007, Dec. 15, 2007, pp. 175-180.

Cheng et al.; "Track Matching by Major Color Histograms Matching and Post-matching Integration"; Faculty of Information Technology, University of Technology, Sydney, Australia; F. Roli and S. Vitulano (Eds.): ICIAP 2005, LNCS 3617, pp. 1148-1157, Jan. 1, 2005; ©Springer-Verlag Berlin Heidelberg 2005.

Examination Report issued by the European Patent Office in corresponding Application No. 15 191 919.8—1906; dated Aug. 3, 2017 (7 pgs.).

* cited by examiner

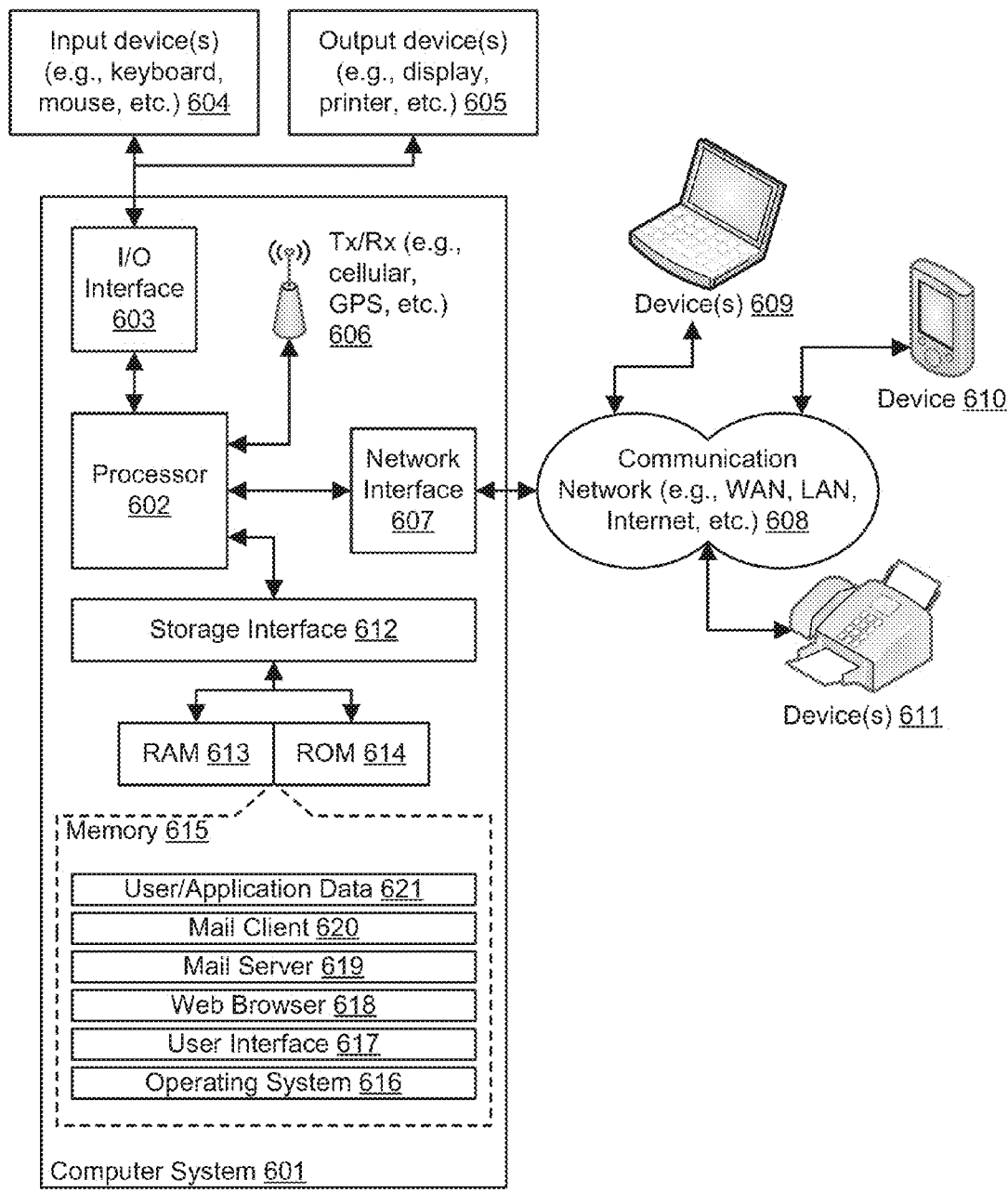
FIG. 6: Example Computer System

US 9,792,664 B2

SYSTEM AND METHOD FOR MAPPING OBJECT COORDINATES FROM A VIDEO TO REAL WORLD COORDINATES USING PERSPECTIVE TRANSFORMATION

PRIORITY CLAIM

This U.S. patent application claims priority under 35 U.S.C. §119 to: India Application No. 420/CHE/2015, filed on Jan. 29, 2015. The aforementioned applications are incorporated herein by reference in their entirety.

TECHNICAL FIELD

This disclosure relates generally to video analysis, and more particularly to systems and methods for mapping object co-ordinates from a video frame view to real world co-ordinates using perspective transformation.

BACKGROUND

The inventors of the disclosed subject matter have recognized that intelligent video analysis may be used to stitch together multiple camera views of a floor plan to monitor people traffic or movement patterns. For example, a retail store surveillance camera system may be mapped to a store plan and store planograms, which may be used to track customers and staff traffic and browsing patterns by store departments and sub-sections. As another example, a similar correlation on a manufacturing site-plan may be used to analyze worker and material movements from one shop-floor to another. As a further example, birds-eye view of a site covered by multiple surveillance cameras may be used to generate business insights.

However, the inventors have also recognized that conventional techniques may not be used to automatically map video coordinates to human world coordinates accurately, because mapping may be performed either to a three-dimensional view or a two-dimensional view. Further, video capture devices typically experience distortions like lens distortion, uneven scaling, and shearing. The distortions would decrease the accuracy of mapping as a coordinate transformation matrix that is accurate in one region of a video frame may not be accurate in another. Further, techniques currently available for detecting overlapping views and blind spots between different cameras are not accurate.

SUMMARY

In one embodiment, a processor-implemented video frame coordinate transformation method is disclosed. The method may include obtaining an image from an image capture device and identifying, via one or more hardware processors, an object depicted in the image. Further, the method may include determining, via the one or more hardware processors, image-frame object coordinates for the object, and selecting, via the one or more hardware processors, one of a plurality of coordinate transformation matrices associated with the image capture device, based on the image-frame object coordinates for the object. Also, the method may include calculating, via the one or more hardware processors, real-world object coordinates for the object using the image-frame coordinates and the selected coordinate transformation matrix, and determining, via the one or more hardware processors, a trajectory of the object using the calculated real-world object coordinates.

In one embodiment, a video frame coordinate transformation system is disclosed. The system may include one or more hardware processors, and a memory storing processor-executable instructions, which when executed, cause the one or more hardware processor to perform acts comprising a method. The method may include obtaining an image from an image capture device and identifying, via one or more hardware processors, an object depicted in the image. Further, the method may include determining, via the one or more hardware processors, image-frame object coordinates for the object, and selecting, via the one or more hardware processors, one of a plurality of coordinate transformation matrices associated with the image capture device, based on the image-frame object coordinates for the object. Also, the method may include calculating, via the one or more hardware processors, real-world object coordinates for the object using the image-frame coordinates and the selected coordinate transformation matrix, and determining, via the one or more hardware processors, a trajectory of the object using the calculated real-world object coordinates.

In one embodiment, a non-transitory computer-readable medium is disclosed, storing computer-executable instructions for performing a video frame coordinate transformation method. The method may include obtaining an image from an image capture device and identifying, via one or more hardware processors, an object depicted in the image. Further, the method may include determining, via the one or more hardware processors, image-frame object coordinates for the object, and selecting, via the one or more hardware processors, one of a plurality of coordinate transformation matrices associated with the image capture device, based on the image-frame object coordinates for the object. Also, the method may include calculating, via the one or more hardware processors, real-world object coordinates for the object using the image-frame coordinates and the selected coordinate transformation matrix, and determining, via the one or more hardware processors, a trajectory of the object using the calculated real-world object coordinates.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 6 is a block diagram of an exemplary computer system for implementing embodiments consistent with the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
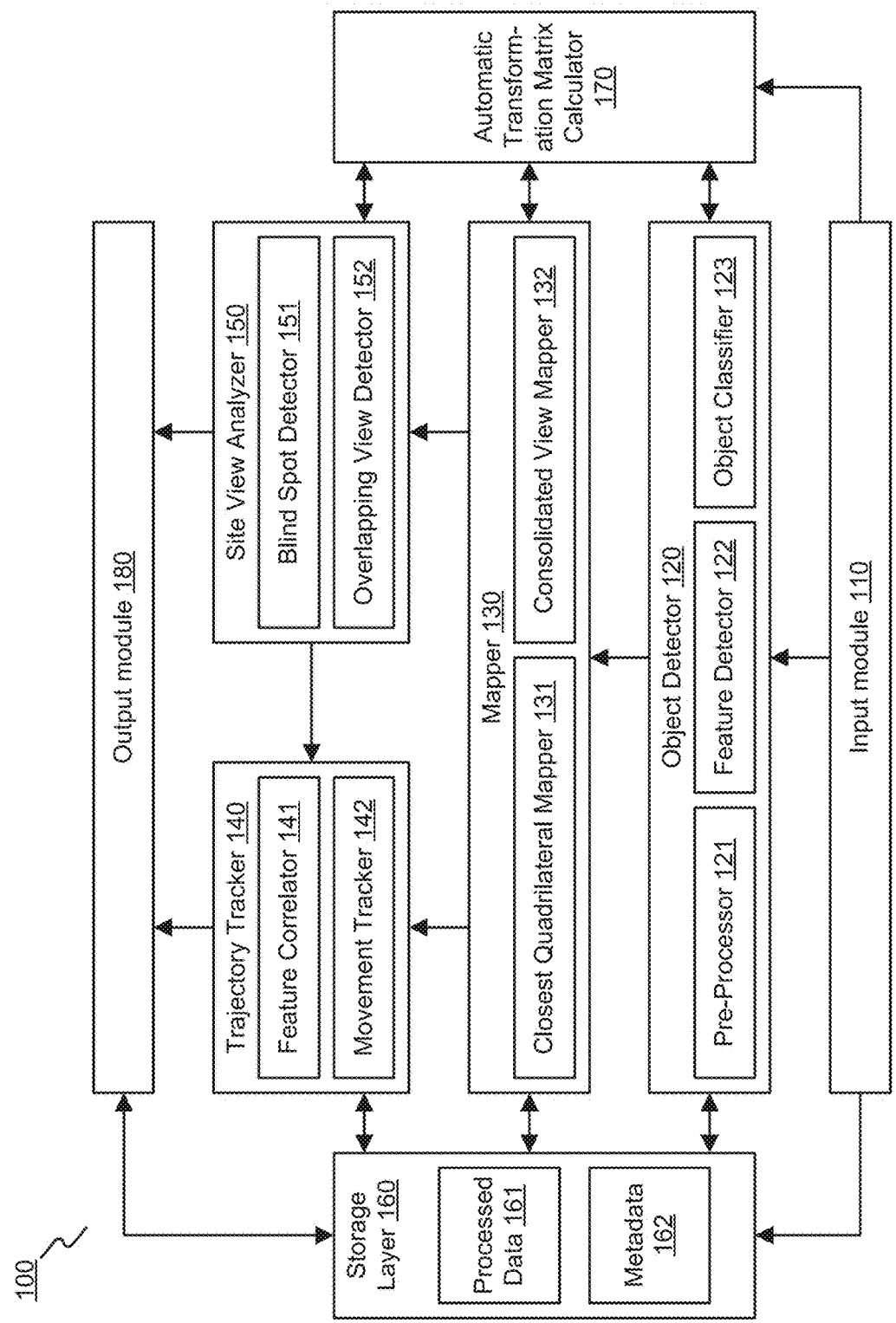
FIG. 1 illustrates an exemplary system architecture for a video-to-real-world mapper system according to some embodiments.

FIG. 1 illustrates exemplary system architecture for a video-to-real-world mapper system 100 according to some embodiments. In some embodiments, the system 100 may include an input module 110. For example, input module 100 may be used to obtain video camera feeds, either in the form of video files or live camera feeds from a third party video management software which controls and manages the surveillance cameras inside a retail store or a campus site. The input module 110 may also be used to obtain a site map for the area under camera surveillance, along with camera positions.

In some embodiments, the system 100 may include an object detector 120. The object detector 120 may be used for detecting different objects such as humans, trolley, etc. In some embodiments, the object detector 120 may include three components. First, the object detector 120 may include a pre-processor 121. The pre-processor 121 may receive video files or lives feed from the input module 110 and convert it into frames, and further classify frames into frames with significant activity/motion and inactive frames. Second, the object detector 120 may include an object classifier 123. Object classifier 123 may utilize techniques like background subtraction, noise removal and blob detection, and detect different objects in the video frames, obtained from the pre-processor 121. Object classifier 123 may classify objects into different classes (e.g., humans, trolleys, equipment, etc.) by using different classifiers such as, e.g., Haar classifier, Hog classifier, etc. In some embodiments, for humans detected in the video frames, the object classifier 123 or other component may detect leg coordinates for the human. Third, the object detector 120 may include a feature detector 122. Feature detector 122 may identify and extract different features of objects identified by the object classifier 123, such as color, height, shape, etc. The components of the object detector 120 may be used for unique identification and tracking of objects across video frames.

In some embodiments, the system 100 may include a mapper 130. In some embodiment, mapper 130 may perform two level of mapping using two components. First mapper 130 may include a closest quadrilateral mapper 131. Closest quadrilateral mapper 131 may map human leg coordinates or object coordinates a section of the site map which corresponds to the camera field of view. The closest quadrilateral mapper 131 may perform this function by automatically determining the closest quadrilateral, and using the transformation matrix, corresponding to the chosen quadrilateral, as generated by the automatic transformation matrix calculator 170. Second, mapper 130 may include a consolidated view mapper 132. The mapping performed by the consolidated view mapper 132 may, in some embodiments, constitute a second level of mapping that maps the object coordinates from the section of the site map corresponding to a single camera field of view to the consolidated site map corresponding to the complete area under surveillance by multiple cameras.

In some embodiments, the system 100 may include a site view analyzer 150. In some embodiments, the site view analyzer 150 may include two components, a blind spot detector 151 and overlapping view detector 152. Blind sport detector 151 may detect blind spots on a consolidated view by using the output of the mapper 130. Blind spot detector 151 may mark as blind spots the points where no objects are detected over a period of time. Overlapping view detector 152 may analyze the output of the mapper 130 over a period of time, and identify regions where the same object is detected from different cameras at the same instant of time as regions of overlap between the respective camera views.

In some embodiments, the system 100 may include a trajectory tracker 140. Trajectory tracker 140 may track an object across views of multiple cameras. In some embodiments, trajectory tracker 140 may include two components, a feature correlator 141 and a movement tracker 142. Feature correlator 141 may obtain features identified by feature detector 122 for each object identified by object classifier 123. Feature correlator 141 may then correlate the detected features to the objects detected in consecutive frames, to establish similarity in objects detected across video frames. Movement tracker 142 may track objects using as input the object coordinates detected and mapped onto the consolidated site map by the mapper 130. For example, the movement tracker 142 may operate using the assumption that detected objects may only move from one place to another following a continuity pattern, e.g., an object cannot move more than a certain distance between consecutive frames. In combination with such an assumption, the movement tracker 142 may utilize the output from the feature correlator 141 for unique trajectory detection.

In some embodiments, the system 100 may include an output module 180. The output module 180 may utilize information from the trajectory tracker 140 to generate other information representing insight into human movement patterns or other behavior. For example, the information from the trajectory tracker 140 may be subject to a time and space analysis to yield various insights such as the dwell time of humans in a particular area, most frequented paths taken by humans/material movements, footfalls by time of day, overcrowding of areas, entry into restricted areas etc. A storage layer 160 may store two types of information, processed data 161 and metadata 162. The analyzed and processed information from the other components may be stored as processed data 161 for further querying and reporting purposes. Metadata 162 may include configuration data required for processing of multiple videos. Metadata 162 may also include transformation matrices and other related data once created by automatic transformation matrix calculator 170, as explained further below.

Figure 2:
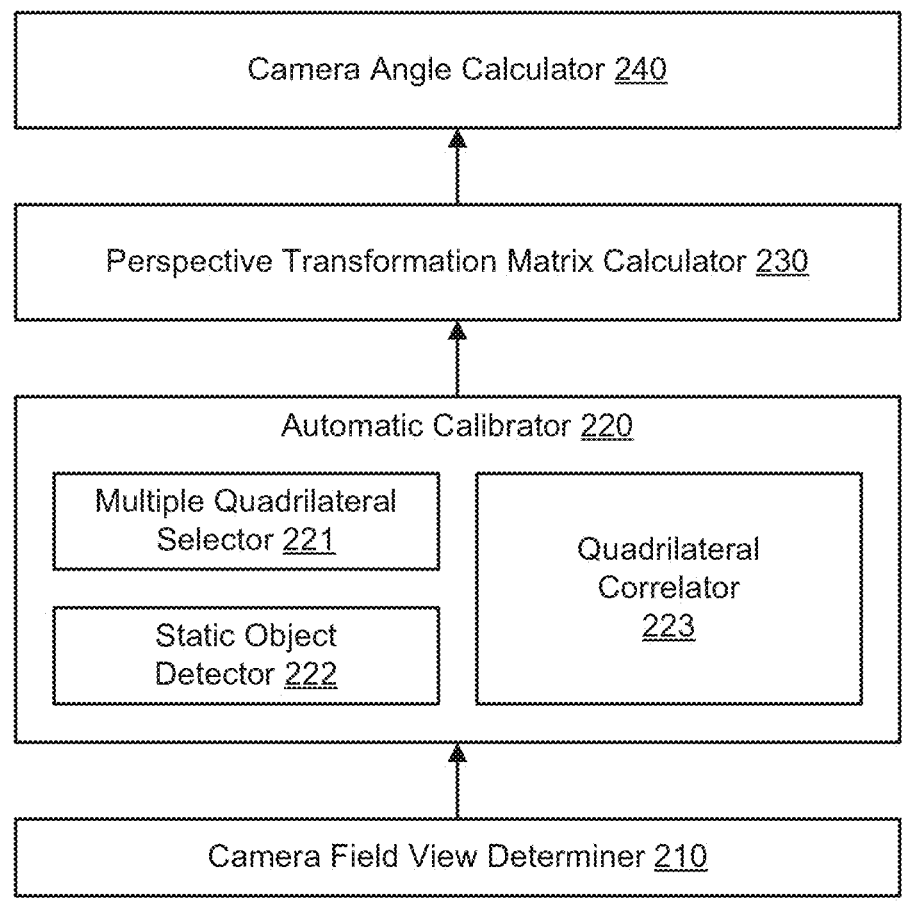
FIG. 2 is a functional block diagram of an automatic transformation matrix calculator according to some embodiments.

FIG. 2 is a functional block diagram of an automatic transformation matrix calculator 170 according to some embodiments. In some embodiments, automatic transformation matrix calculator 170 may include a number of components—e.g., a camera filed view determiner 210, an automatic calibrator 220, a perspective transformation matrix calculator 230, and a camera angle calculator 240.

Camera field view determiner 210 may include a third-party computer-aided design (CAD) software to determine the field of view of each camera on the basis of camera position. Automatic calibrator may provide information to calibrate a camera. In some embodiments, it may include three components—a static object detector 222, a multiple quadrilateral selector 221, and a quadrilateral correlator 223. Static object detector may detect various static object within the field of view of a video frame of a camera. Different corners, edges, aisles may also be detected in each video/camera view. In some embodiments, static object detector 222 may perform static object detection for real world camera view as well as a corresponding section of the site map or the 3D CAD View. Multiple quadrilateral selector 221 may detect for each camera, multiple quadrilaterals on the basis of correlation of corners/edges detected by the static object detector 222. The system 100 may use the output of the multiple quadrilateral selector 221 to counter the effect of multiple distortions in a camera, as explained further below. Quadrilateral correlator 223 may correlate quadrilaterals detected in camera view and real world/site views, and determine a corresponding mapping between the views. In some embodiments, automatic transformation matrix calculator 170 may include a perspective transformation calculator 230. On the basis of correlated quadrilaterals, the perspective transformation matrix calculator 230 may calculate perspective transformation matrices that may eventually be used for mapping. Finally, in some embodiments, automatic transformation matrix calculator 170 may include a camera angle calculator 240, which may calculate camera angles (e.g., yaw, pitch, and roll) with the help of the perspective transformation matrices.

Figure 3:
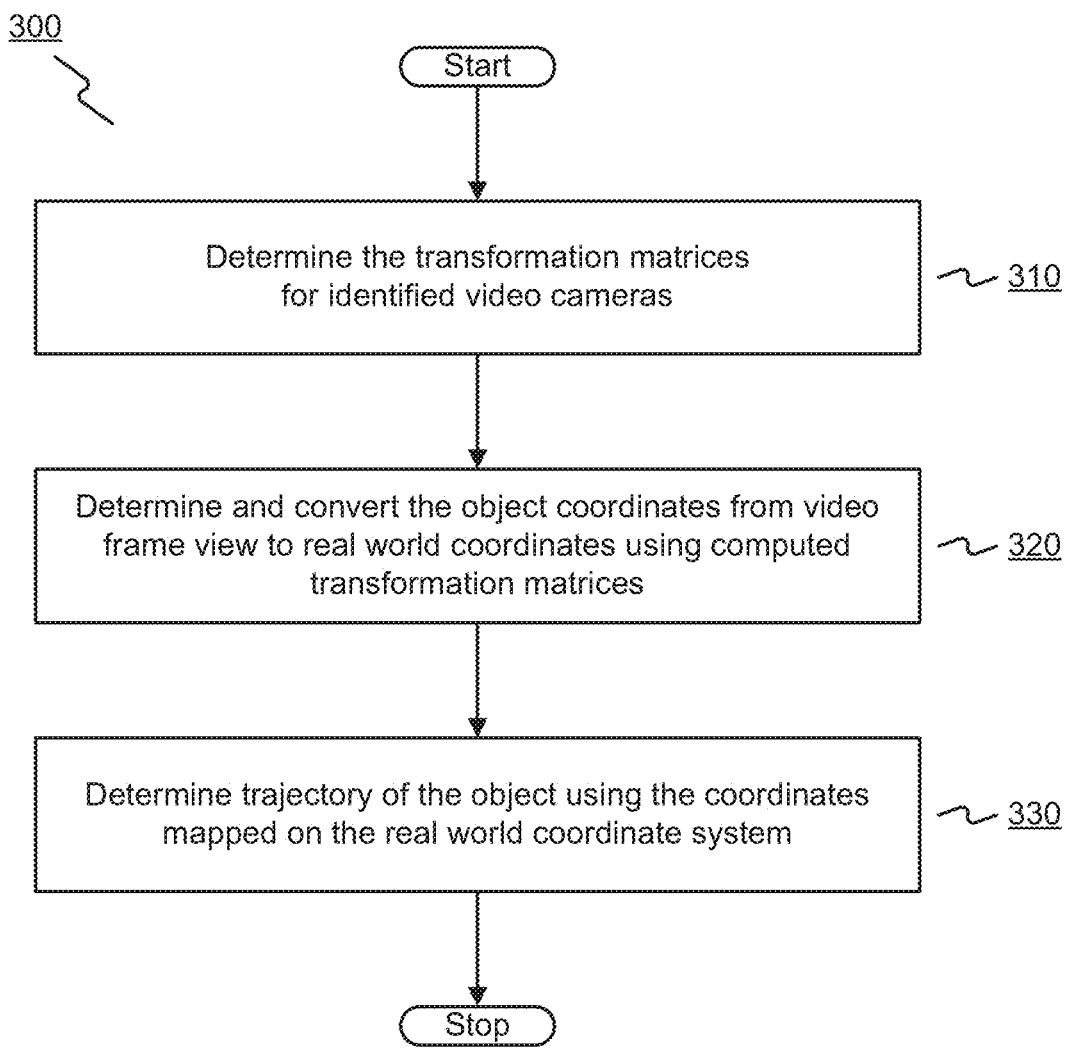
FIG. 3 is a flow diagram illustrating a method for video-to-real-world mapping according to some embodiments.

FIG. 3 is a flow diagram illustrating a method 300 for video-to-real-world mapping according to some embodiments. At step 310 of method 300, video-to-real-world mapper system 100 may determine the transformation matrices for an identified video camera. For this purpose, video-to-real-world mapper system 100 may utilize automatic transformation matrix calculator 170, as well as other components. For example, video-to-real-world mapper system 100 may determine the camera's field of view based on video captured using input module 110, e.g., from video management software that controls the surveillance cameras for a site. The site map may also be fed to the input module 110 along with the camera locations on the site map. The camera field view determiner 210, using third party CAD software, may determine the field of view of each camera on the basis of the site map and video sent from input module 110 to camera field view determiner 210. As the original site map can be very large and covered by multiple cameras, sections of the site-map corresponding to individual camera may be snipped before processing. A coordinate mapping of the points in the snipped section of the site-map (corresponding to each camera view) to the points in the consolidated site map may be maintained by the camera field view determiner 210.

Frames corresponding to an individual camera field of view obtained from input module 110 may undergo preprocessing for noise removal, illumination removal and background generation, using pre-processor 121. These frames may be further processed by static object detector 222 to extract features of static objects like doors, shelves, aisles, etc. Features may be extracted using geometrical, morphological, color, and/or gradient based feature extraction, among extraction of other types of features. Feature vectors of static objects obtained in this step may be used as input for further quadrilateral selection and correlation. Then, static object detector 222 may compute feature vectors corresponding to static objects detected in video frames, and may determine one or more quadrilaterals defining static objects in the video frames using adjacency and connectivity of the feature vectors. The quadrilateral correlator 223 may then correlate the feature vectors generated by static object detector 222 to the morphology of shapes present in the snipped site map view obtained from the camera field view determiner 210 to identify corresponding quadrilaterals in the site map.

Accordingly, multiple quadrilateral selector 221 may select multiple quadrilaterals corresponding to objects identified by static object detector 222. In some embodiments, an optimum number of quadrilaterals may be selected by maximizing the area on the site map covered by the quadrilaterals. Quadrilateral correlation may then maximize the number of quadrilaterals in the case of overlapping quadrilaterals by minimizing the distance of points from quadrilateral edges. Multiple quadrilaterals may hence be correlated to remove the mapping error generated due to increasing distance from quadrilateral edges. For perspective transformation of a 3D coordinate (x, y, z) in the camera view to its corresponding coordinate (X,Y,Z) in the real world view, a 4×4 matrix may be used according to the formula:

$$\begin{bmatrix} a & b & c & d \\ e & f & g & h \\ i & j & k & l \\ m & n & o & 1 \end{bmatrix} * \begin{bmatrix} x \\ y \\ z \\ 1 \end{bmatrix} = \begin{bmatrix} X \\ Y \\ Z \\ 1 \end{bmatrix}$$

In some embodiments, during the mapping, the points may be mapped at ground level, i.e., z=0, so some terms of above matrix (e.g., c, g, l, j, and k) may become irrelevant. In such instances, the matrix which remains is given below. The matrix may have 8 unknowns, and require mapping of 4 points to solve it. Four points of quadrilaterals may be derived from multiple quadrilateral selection and correlation and used to compute the unknowns in the following matrix:

$$\begin{bmatrix} a & b & d \\ e & f & h \\ m & n & 1 \end{bmatrix} * \begin{bmatrix} x \\ y \\ 1 \end{bmatrix} = \begin{bmatrix} X \\ Y \\ 1 \end{bmatrix}$$

The third row-element of the new coordinate system matrix above may be normalized to 1, by dividing the whole matrix by its value.

At step 320, video-to-real-world mapper system 100 may determine and convert the object coordinates from the video frame coordinates to real-world coordinates using the computed transformation matrices. Object detector 120 may be utilized to determine object coordinates using techniques like background subtraction, HOG descriptors etc. Preprocessor 121 may preprocess video obtained from input module 110, including applying noise removal algorithms to nullify the effects of illumination changes. After subtracting background, the video frame may be used to segregate active and inactive frames that are then are forwarded to feature detector 122. Feature detector 122 may perform feature extraction. In the feature detector 122, the geometrical, morphological, color and gradient based feature descriptors may be used to extract feature vectors of the pixels present in active frames. Different combination of the above feature vectors may be used to identify an object to be detected and define the final feature vector to be used for object classification. Object classifier 123 may classify the identified objects. For example, classifier models in object classifier 123 may be trained initially with feature vectors of the object and corresponding labels like human, trolley, carts, etc. Feature vectors extracted after performing feature extraction may be then classified using classifiers that provide labels corresponding to every object to be analyzed in the frames generated after preprocessing. The position coordinates of every labelled object may be determined and provided to mapper 130 for further processing. The mapper 130 may determine the real-world coordinates corresponding to the video frame coordinates for each object in the video frames, using the transformation matrices computed using automatic transformation matrix calculator 170, as explained with reference to FIG. 4.

Figure 4:
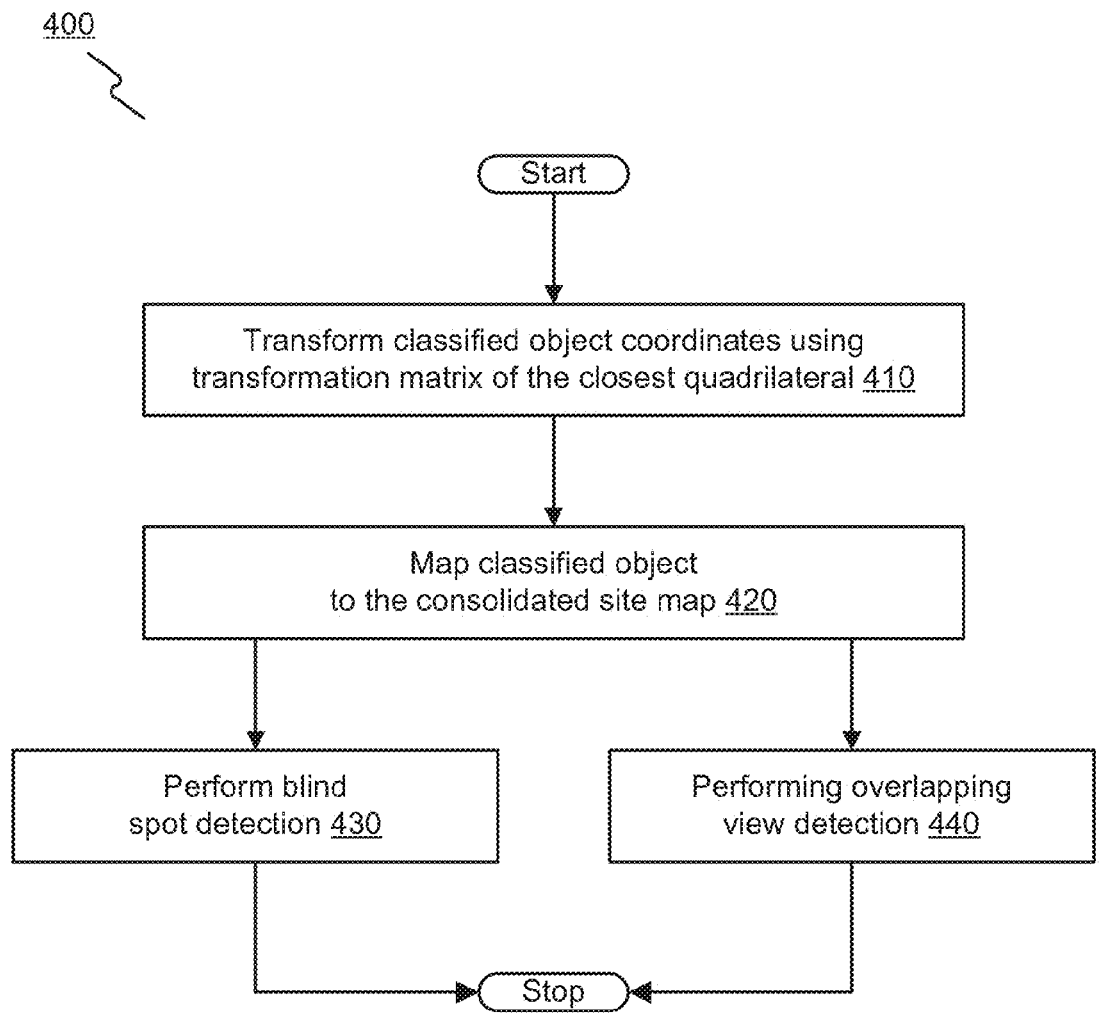
FIG. 4 is a flow diagram illustrating a method for video frame coordinate transformation according to some embodiments.

FIG. 4 is a flow diagram illustrating a method for video frame coordinate transformation according to some embodiments. In some embodiments, first, the classified objects may be mapped to a closest quadrilateral (step 410). For example, the multiple quadrilateral selector 221 may determine transformation matrices corresponding to each quadrilateral for a single camera view, while performing multiple quadrilateral selection and correlation. The selection of the transformation matrix to be used for mapping may be performed on the basis of following logic. The minimum distance between the object points to be transformed (e.g., the object position/human leg coordinates) and each side of each quadrilateral may be calculated. The corresponding transformation matrix to the quadrilateral whose side is closest to the object points may be used for transformation (e.g., via matrix multiplication of the object video frame coordinates with the selected closest-quadrilateral transformation matrix).

Further, the classified object objects may be mapped to a consolidated site map (step 420), using the transformed real-world object coordinates. For example, the objects mapped through the closest quadrilateral method onto the snipped section of the site map, corresponding to each camera view, may be mapped onto the consolidated sitemap using the coordinate mapping stored by the camera field-of-view determiner 210.

In some embodiments, the system 100 may perform blind spot detection in a consolidated site map (step 430). The blind spot regions on the consolidated map, not covered by any camera view, may detected through the field of view determiner 210. Within a camera field of view, blind spots may be present as areas obscured by large objects beyond which a human/material movement is not visible. These may be detected, in the Blind-Spot Detector 151 of the Site View Analyzer 150, by analyzing the mapping of classified objects over a period of time. If no activity is detected in a region for a pre-determined period of time, it may be labeled as a blind spot.

In some embodiments, the system 100 may perform overlapping view detection in a consolidated site map using overlapping view detector 152 (step 440). For example, on the consolidated site map received from metadata 162 of the storage layer 160, if the same object is detected by mapper 130 at the same position from two cameras at the same instance of time (or within a pre-determined time window), it may imply that the region under consideration is visible in the two camera field of views, and may be labeled as an overlapping region.

Returning to FIG. 3, at step 330, video-to-real-world mapper system 100 may determine the trajectory of classified objects using the coordinates mapped on the real world coordinate system, as explained with reference to FIG. 5.

Figure 5:
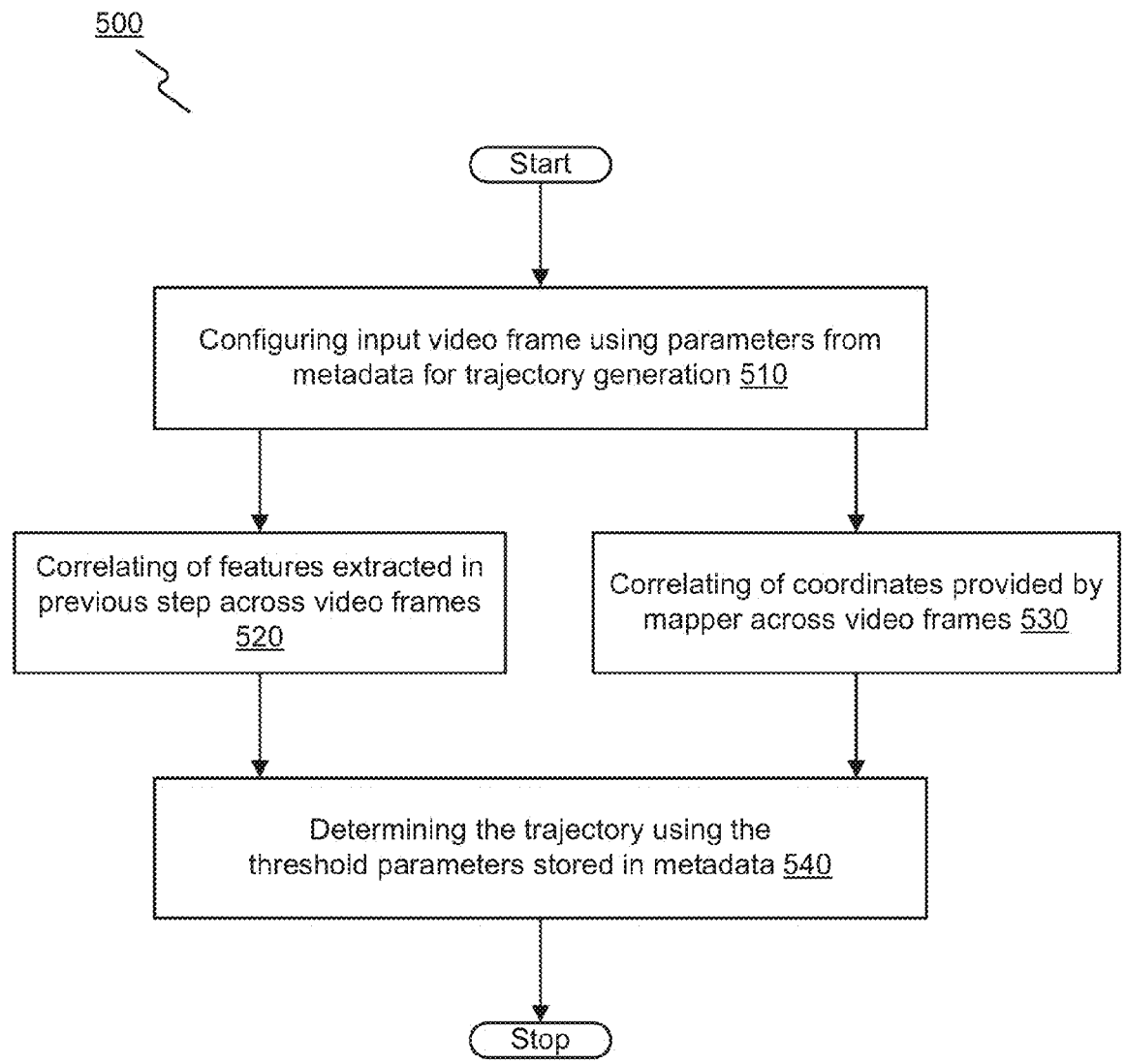
FIG. 5 is a flow diagram illustrating a method for object trajectory determination according to some embodiments.

FIG. 5 is a flow diagram illustrating a method for object trajectory determination according to some embodiments. In some embodiments, at step 510, trajectory tracker 140 may configure the input video frame using parameters from metadata 162 for trajectory generation. For example, depending on the resolution, quality and scenario of the video, threshold parameters governing correlation of features and movement to establish trajectory may be defined and configured in metadata 162 and storage layer 160, for use by feature correlator 141. For instance, for a video at 30 frames per second, a human can move a smaller distance between two consecutive frames, than a video at 5 frames per second. Similarly, for a scenario where people keep moving behind an aisle before appearing video frames, it is possible that a human is only half detected in one frame and is completely visible in the next frame. In the feature correlator 141, various features such as color, shape, height etc. may be extracted for every object detected in a video frame. Feature correlator 141 may correlate each feature to an object detected in different video frames. A similarity in one or more features across video frames may imply a higher probability of the objects in the video frames being the same object. For example, correlation between a color-based feature descriptor may ensure that a red-colored object in a current frame is correlated with a red-colored object in consecutive frames (provided that assumptions such as how fast an active object can move across video frames are satisfied). Similarly, correlation between geometrical descriptors may ensure that a circular object in a current frame is correlated with another circular object in consecutive video frames. Accordingly, feature correlations across multiple features of objects may be performed to attain feature correlation with a high (e.g., >=95% degree of confidence). A final feature-based correlation score may be derived by taking a weighted sum of correlations of color, geometrical features, and other features. The feature-based correlation score may then be forwarded to other components within the trajectory tracker 140 for further processing.

Trajectory tracker 140 may correlate coordinates provided by mapper 130 across video frames. For example, mapper 130 may provide the real-world coordinates of an object detected across the input video frames to movement tracker 142. Movement tracker 142 may then compute a correlation score for objects in real-world coordinates across consecutive frames using threshold parameters stored in metadata 162 and storage layer 160. This coordinates-based correlation score may then be used for further processing.

The trajectory tracker 140 may determine the trajectory using threshold parameters stored in metadata 162. For example, the two correlation scores provided by the feature correlator 141 and movement tracker 142 may be combined, and if the result is above a threshold defined in the metadata 162 of storage layer 160, the object may be concluded to be the same across the video frames. This process may be repeated for all consecutive frames in trajectory tracker 140 and stored as metadata 162 of storage layer 160. Accordingly, the movement trajectory of objects may be defined. In case the result of combining the correlation scores is below the threshold provided by metadata 162 and storage layer 160, the object may be marked as a new object in the subsequent video frame, and two different trajectories may then be generated and identified by output module 180.

Computer System

FIG. 6 is a block diagram of an exemplary computer system for implementing embodiments consistent with the present disclosure. Variations of computer system 601 may be used for implementing the various devices included in this disclosure. Computer system 601 may comprise a central processing unit ("CPU" or "processor") 602. Processor 602 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 610, 611, and 612. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, databases for storing the data (e.g., video feeds, images, site maps, coordinate transformation matrices) discusses in this disclosure.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc., as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described systems and methods for mapping object co-ordinates from a video frame view to real world co-ordinates using perspective transformation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented video frame coordinate transformation method, comprising:
    obtaining an image from an image capture device;
    identifying, via one or more hardware processors, an object depicted in the image;
    determining, via the one or more hardware processors, image-frame object coordinates for the object;
    selecting, via the one or more hardware processors, one of a plurality of coordinate transformation matrices associated with the image capture device, based on the image-frame object coordinates for the object;
    calculating, via the one or more hardware processors, real-world object coordinates for the object using the image-frame coordinates and the selected coordinate transformation matrix;
    determining, via the one or more hardware processors, a trajectory of the object using the calculated real-world object coordinates;
    determining, via the one or more hardware processors, that a position on a map of a site in which the image capture device is located is not included in any trajectory of any object for a predetermined period of time; and
    classifying, via the one or more hardware processors, the position on the map as a blind spot.

2. The method of claim 1, wherein selecting the one of the plurality of coordinate transformation matrices comprises:
    identifying a quadrilateral associated with a static object in the image as closest, to the image-frame object coordinates for the object, among quadrilaterals used to determine the plurality of coordinate transformation matrices; and
    selecting a coordinate transformation matrix determined using the identified quadrilateral as the one of the plurality of coordinate transformation matrices.

3. The method of claim 1, further comprising:
    classifying, via the one or more hardware processors, the image as an image that includes object motion; and
    identifying, via the one or more hardware processors, the object depicted in the image after classifying the image as an image that includes object motion.

4. The method of claim 1, further comprising:
    extracting, via the one or more hardware processors, one or more features of the object for uniquely identifying the object; and
    determining, via the one or more hardware processors, the trajectory of the object based on uniquely identifying the object using the one or more extracted features.

5. The method of claim 1, wherein determining the trajectory of the object includes:
    determining, via the one or more hardware processors, a position of the object on a map of a site in which the image capture device is located.

6. The method of claim 1, further comprising:
    obtaining, via the one or more hardware processors, a second image from a second image capture device; and
    determining, via the one or more hardware processors, the trajectory of the object using the second image captured from the second image capture device.

7. The method of claim 6, further comprising:
    calculating a first position of the object on a map of a site using the image;

calculating a second position of the object on the map of the site using the second image;

determining that a distance between the first position and the second position is less than a predetermined threshold; and identifying a region of overlap on the map of the site based on determining that the distance between the first position and the second position is less than the predetermined threshold.

8. A video frame coordinate transformation system, comprising:

one or more hardware processors; and
one or more memory devices storing instructions executable by the one or more hardware processors for:
obtaining an image from an image capture device;
identifying an object depicted in the image;
determining image-frame object coordinates for the object;
selecting one of a plurality of coordinate transformation matrices associated with the image capture device, based on the image-frame object coordinates for the object;
calculating real-world object coordinates for the object using the image-frame coordinates and the selected coordinate transformation matrix;
determining a trajectory of the object using the calculated real-world object coordinates;
determining that a position on a map of a site in which the image capture device is located is not included in any trajectory of any object for a predetermined period of time; and
classifying the position on the map as a blind spot.

9. The system of claim 8, wherein selecting the one of the plurality of coordinate transformation matrices comprises:

identifying a quadrilateral associated with a static object in the image as closest, to the image-frame object coordinates for the object, among quadrilaterals used to determine the plurality of coordinate transformation matrices; and
selecting a coordinate transformation matrix determined using the identified quadrilateral as the one of the plurality of coordinate transformation matrices.

10. The system of claim 8, the one or more memory devices further storing instructions executable by the one or more hardware processors for:

classifying, via the one or more hardware processors, the image as an image that includes object motion; and
identifying, via the one or more hardware processors, the object depicted in the image after classifying the image as an image that includes object motion.

11. The system of claim 8, the one or more memory devices further storing instructions executable by the one or more hardware processors for:

extracting, via the one or more hardware processors, one or more features of the object for uniquely identifying the object; and
determining, via the one or more hardware processors, the trajectory of the object based on uniquely identifying the object using the one or more extracted features.

12. The system of claim 8, wherein determining the trajectory of the object includes:

determining, via the one or more hardware processors, a position of the object on a map of a site in which the image capture device is located.

13. The system of claim 8, the one or more memory devices further storing instructions executable by the one or more hardware processors for:

obtaining, via the one or more hardware processors, a second image from a second image capture device; and
determining, via the one or more hardware processors, the trajectory of the object using the second image captured from the second image capture device.

14. The system of claim 13, the one or more memory devices further storing instructions executable by the one or more hardware processors for:

calculating a first position of the object on a map of a site using the image;
calculating a second position of the object on the map of the site using the second image;
determining that a distance between the first position and the second position is less than a predetermined threshold; and
identifying a region of overlap on the map of the site based on determining that the distance between the first position and the second position is less than the predetermined threshold.

15. A non-transitory computer-readable medium storing computer-executable video frame coordinate transformation instructions for:

obtaining an image from an image capture device;
identifying an object depicted in the image;
determining image-frame object coordinates for the object;
selecting one of a plurality of coordinate transformation matrices associated with the image capture device, based on the image-frame object coordinates for the object;
calculating real-world object coordinates for the object using the image-frame coordinates and the selected coordinate transformation matrix;
determining a trajectory of the object using the calculated real-world object coordinates
determining that a position on a map of a site in which the image capture device is located is not included in any trajectory of any object for a predetermined period of time; and
classifying the position on the map as a blind spot.

16. The medium of claim 15, wherein selecting the one of the plurality of coordinate transformation matrices comprises:

identifying a quadrilateral associated with a static object in the image as closest, to the image-frame object coordinates for the object, among quadrilaterals used to determine the plurality of coordinate transformation matrices; and
selecting a coordinate transformation matrix determined using the identified quadrilateral as the one of the plurality of coordinate transformation matrices.

17. The medium of claim 15, further storing instructions for:

classifying, via the one or more hardware processors, the image as an image that includes object motion; and
identifying, via the one or more hardware processors, the object depicted in the image after classifying the image as an image that includes object motion.

18. The medium of claim 15, further storing instructions for:

extracting, via the one or more hardware processors, one or more features of the object for uniquely identifying the object; and
determining, via the one or more hardware processors, the trajectory of the object based on uniquely identifying the object using the one or more extracted features.

19. The medium of claim 15, wherein determining the trajectory of the object includes:
  determining, via the one or more hardware processors, a position of the object on a map of a site in which the image capture device is located.

20. The medium of claim 15, further storing instructions for:
  obtaining, via the one or more hardware processors, a second image from a second image capture device; and
  determining, via the one or more hardware processors, the trajectory of the object using the second image captured from the second image capture device.

21. The medium of claim 20, further storing instructions for:
  calculating a first position of the object on a map of a site using the image;
  calculating a second position of the object on the map of the site using the second image;
  determining that a distance between the first position and the second position is less than a predetermined threshold; and
  identifying a region of overlap on the map of the site based on determining that the distance between the first position and the second position is less than the predetermined threshold.

* * * * *